(12) United States Patent
Johnson et al.

(10) Patent No.: US 7,661,034 B2
(45) Date of Patent: Feb. 9, 2010

(54) MULTILAYERED ARCHITECTURE FOR STORAGE PROTOCOL CONFORMANCE TESTING OF STORAGE DEVICES

(75) Inventors: Timothy A. Johnson, Tucson, AZ (US); William W. Owen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 11/041,771

(22) Filed: Jan. 24, 2005

(65) Prior Publication Data
US 2006/0168477 A1 Jul. 27, 2006

(51) Int. Cl.
*G06F 11/00* (2006.01)
(52) U.S. Cl. ........................................ 714/43
(58) Field of Classification Search .................... 714/43
See application file for complete search history.

(56) References Cited

U.S. PATENT DOCUMENTS

| 5,579,476 | A | 11/1996 | Cheng et al. | |
|---|---|---|---|---|
| 5,623,500 | A | 4/1997 | Whetsel, Jr. | |
| 6,373,822 | B1 | 4/2002 | Raj et al. | |
| 6,654,349 | B1 | 11/2003 | Lee | |
| 7,107,534 | B1 * | 9/2006 | de Jong et al. | 715/734 |
| 7,162,550 | B2 * | 1/2007 | Douglas | 710/35 |
| 2002/0116675 | A1 | 8/2002 | Gangl et al. | |
| 2004/0015611 | A1 * | 1/2004 | Kim | 709/250 |
| 2004/0078630 | A1 * | 4/2004 | Niles et al. | 714/5 |
| 2006/0136575 | A1 * | 6/2006 | Payne et al. | 709/219 |

FOREIGN PATENT DOCUMENTS

| JP | 4096455 A | 3/1992 |
|---|---|---|
| JP | 6188952 A | 7/1994 |

* cited by examiner

*Primary Examiner*—Scott T Baderman
*Assistant Examiner*—Jigar Patel
(74) *Attorney, Agent, or Firm*—Rabindranath Dutta; Konrad Raynes & Victor LLP

(57) ABSTRACT

A storage protocol test server interfaced with a storage device and a client includes a multi-layered architecture for testing a conformance of the storage device to a storage protocol as dictated by the client. The layers operate to participate in a test case session between the server and the client to facilitate a communication of test case information from the client to the server, the test case information specifying elements for testing the conformance of the storage device to the storage protocol. Additionally, the layers operate to create a storage protocol conformance test based on the test case information received from the client, the test being specifically designed for testing the conformance of the storage device to the storage protocol, and to participate in a test session between the server and the storage device to facilitate an exchange of test instructions and test results in accordance with the test.

17 Claims, 10 Drawing Sheets

MULTILAYERED ARCHITECTURE FOR STORAGE PROTOCOL CONFORMANCE TESTING OF STORAGE DEVICES

FIELD OF INVENTION

The present invention generally relates to storage protocol conformance testing of storage devices. The present invention specifically relates to a testing system suitable for facilitating a variety of storage protocol conformance tests.

BACKGROUND OF THE INVENTION

Storage protocol conformance testing is known in the art for verifying an operation of a storage interface to an industry standard. There are many different storage protocols (e.g., Fibre Channel, Serial Attached SCSI, and iSCSI), and historically different test systems (e.g., hardware and device drivers) have been required to test the different storage protocols. Specifically, the test system for Fibre Channel is different than the test system for Serial Attached SCSI, which is different than the test system for iSCSI. Furthermore, the test systems for variations of a storage protocol may be different.

As such, there is little, if any, reuse between test systems for different storage protocols and different variations of a storage protocol. It is a challenge for the computer industry to therefore develop techniques for reusing a test system that is used for a particular storage protocol to the greatest extent possible in developing a new test system for a different storage protocol or variation of a storage protocol.

SUMMARY OF THE INVENTION

A first form of the present invention is a signal bearing medium tangibly embodying a program of machine-readable instructions executable by a processor to operate a storage protocol test server, the operations comprising a test case session between the storage protocol test server and a client to facilitate a communication of test case information from the client to the storage protocol test server, wherein the test case information specifies elements for testing a conformance of a storage device to a storage protocol; a creation of a storage protocol conformance test based on the test case information received from the client, wherein the storage protocol conformance test is specifically designed for testing the conformance of the storage device to the storage protocol; and a test session between the storage protocol test server and the storage device to facilitate an exchange of test instructions and test results between the storage protocol test server and the storage device in accordance with the storage protocol conformance test.

A second form of the present invention is a storage protocol test server employing a processor, and a memory for storing instructions operable with the processor to operate the storage protocol test server. The instructions are executed for participating in a test case session between the storage protocol test server and a client to facilitate a communication of test case information from the client to the storage protocol test server, wherein the test case information specifies elements for testing a conformance of a storage device to a storage protocol; generating a storage protocol conformance test based on the test case information received from the client, wherein the storage protocol conformance test is specifically designed for testing the conformance of the storage device to the storage protocol; and participating in a test session between the storage protocol test server and the storage device to facilitate an exchange of test instructions and test results between the storage protocol test server and the storage device in accordance with the storage protocol conformance test.

A third form of the present invention is method involving a test case session between the storage protocol test server and a client to facilitate a communication of test case information from the client to the storage protocol test server, wherein the test case information specifies elements for testing a conformance of a storage device to a storage protocol; a creation of a storage protocol conformance test based on the test case information received from the client, wherein the storage protocol conformance test is specifically designed for testing the conformance of the storage device to the storage protocol; and a test session between the storage protocol test server and the storage device to facilitate an exchange of test instructions and test results between the storage protocol test server and the storage device in accordance with the storage protocol conformance test.

A fourth form of the present invention is a storage protocol testing module employing a protocol server interface layer, a specific protocol layer, and a traffic generator/retriever layer. The protocol server interface layer is operable to participate in a test case session between the storage protocol test server and a client to facilitate a communication of test case information from the client to the storage protocol test server, wherein the test case information specifies elements for testing a conformance of a storage device to a storage protocol. The specific protocol object layer is operable to generate a storage protocol conformance test based on the test case information received from the client, wherein the storage protocol conformance test is specifically designed for testing the conformance of the storage device to the storage protocol. The traffic generator/retriever layer is operable to participate in a test session between the storage protocol test server and the storage device to facilitate an exchange of test instructions and test results between the storage protocol test server and the storage device in accordance with a storage protocol conformance test.

The foregoing forms as well as other forms, objects, aspects, features and advantages of the present invention will become further apparent from the following detailed description of various embodiments of the present invention. The detailed description and drawings are merely illustrative of the present invention rather than limiting, the scope of the present invention being defined by the appended claims and equivalents thereof.

DETAILED DESCRIPTION OF THE PRESENT INVENTION

The present invention provides a new and unique storage protocol testing module having software and/or hardware structurally configured in a multi-layered architecture for testing a conformance of the storage device to a storage protocol as dictated by the client. In particular, a storage protocol test server of the present invention is a server by which a client can create protocol objects through an interface of the multi-layered architecture, specify attributes for the created protocol objects that are specific to the storage protocol being tested, trigger the protocol objects to be directed as stimulus to a storage device under test, retrieve responses from the tested storage device, and compare the received test results to results expected by the client.

To facilitate an understanding of the present invention, various embodiments of the present invention as illustrated in FIGS. 2-12 will now be described in the context of an exemplary storage environment illustrated in FIG. 1. Accordingly, those having ordinary skill in the art will appreciate how to make and use the present invention as set forth in FIGS. 2-12 in the context of other storage environments.

Figure 1:
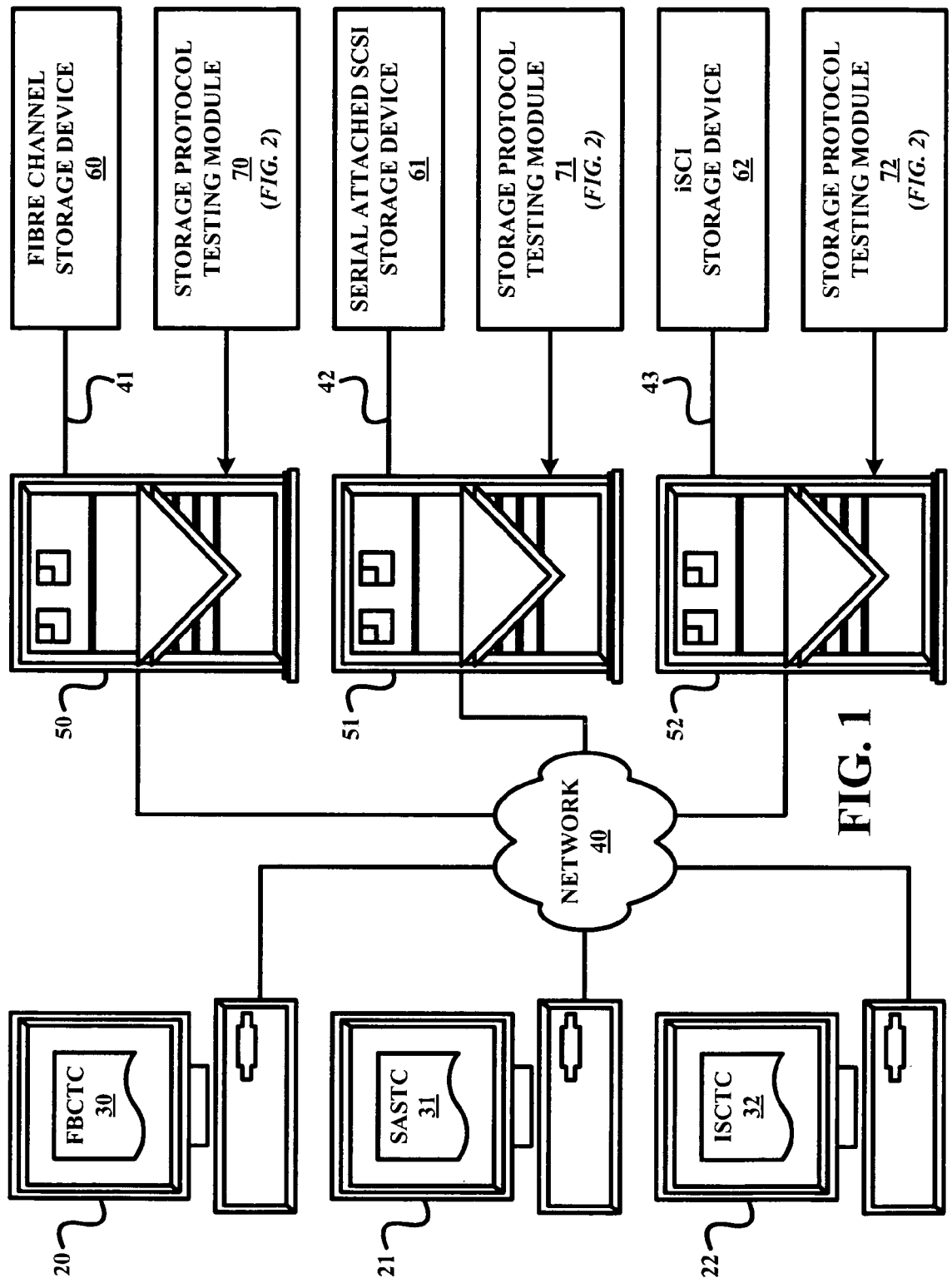
FIG. 1 illustrates an exemplary storage environment for practicing the present invention.

Referring to FIG. 1, a fibre channel storage system to be tested includes a storage protocol test server 50 operably connected to a client 20 via a network 40, and operably connected to a fibre channel storage device 60 via a fibre channel connection 41. A storage protocol testing module 70 of the present invention is installed within server 50 to enable client 20 to test a conformance of fibre channel storage device 60 to a fibre channel storage protocol in accordance with a fibre channel test case ("FBCTC") 30 set forth at client 20.

A serial attached SCSI storage system to be tested includes a storage protocol test server 51 operably connected to a client 21 via network 40, and operably connected to a serial attached SCSI storage device 61 via a SCSI connection 42. A storage protocol testing module 71 of the present invention is installed within server 51 to enable client 21 to test a conformance of serial attached SCSI storage device 61 to a serial attached SCSI storage protocol in accordance with a serial attached SCSI test case ("SASTC") 31 set forth at client 21.

An iSCSI storage system to be tested includes a storage protocol test server 52 operably connected to a client 22 via network 40, and operably connected to a iSCSI storage device 62 via a iSCSI connection 43. A storage protocol testing module 72 of the present invention is installed within server 52 to enable client 22 to test a conformance of iSCSI storage device 62 to an iSCSI storage protocol in accordance with an iSCSI test case ("ISCTC") 32 set forth at client 22.

Figure 2:
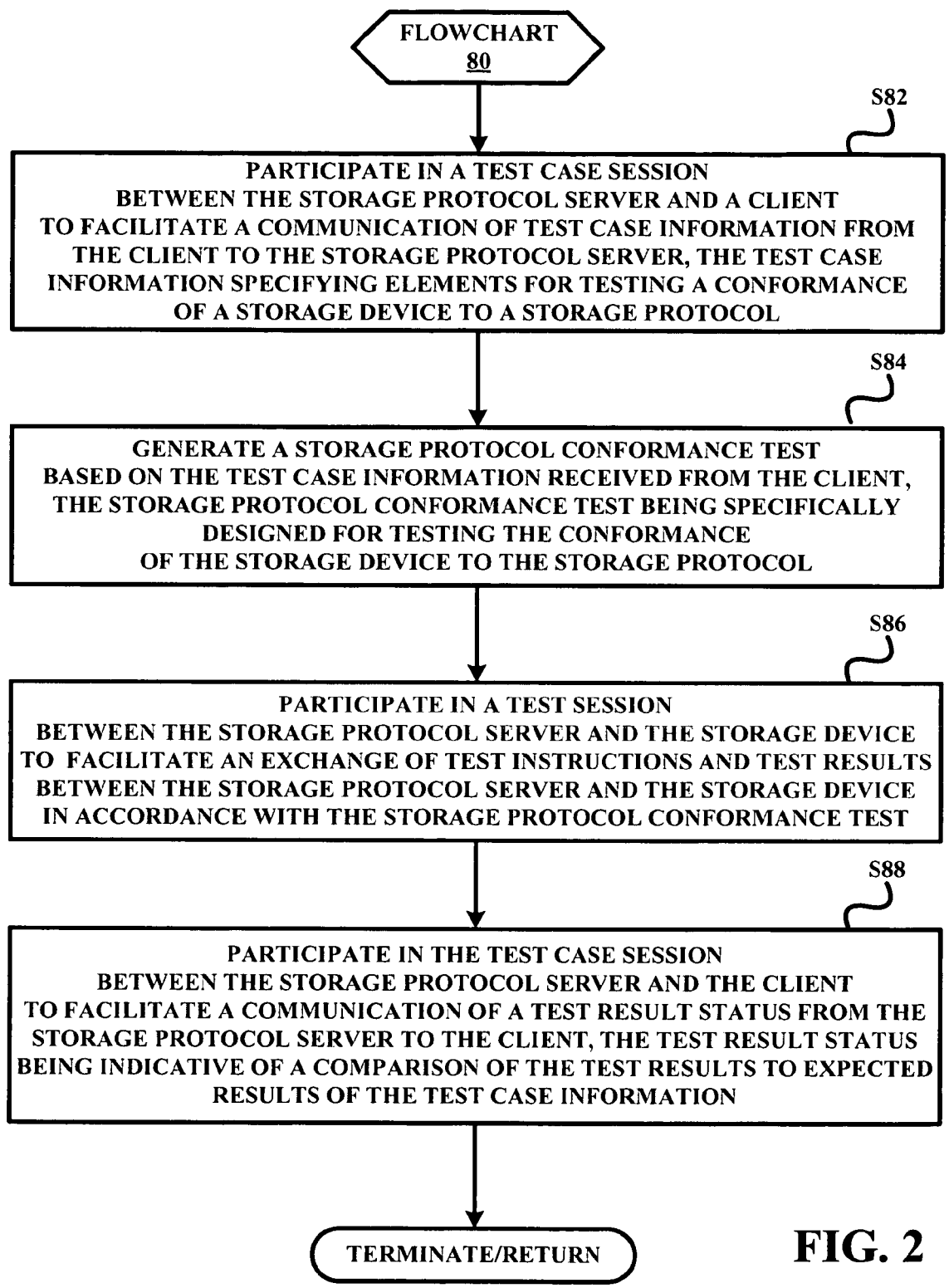
FIG. 2 illustrates a flowchart representative of one embodiment of a storage protocol testing method of the present invention.

Modules 70-72 enable respective clients 20-22 to test a conformance of respective storage devices 60-62 in accordance with a storage protocol testing method of the present invention as represented by a flowchart 80 illustrated in FIG. 2.

Referring to FIG. 2, a stage S82 of flowchart 80 encompasses a test case session being established between a storage protocol test server of the present invention and client to facilitate a communication of test case information from the client to the storage protocol test server where the test case information specifies elements for testing a conformance of a storage device operably connected to the storage protocol test server to a particular storage protocol.

Figure 3:
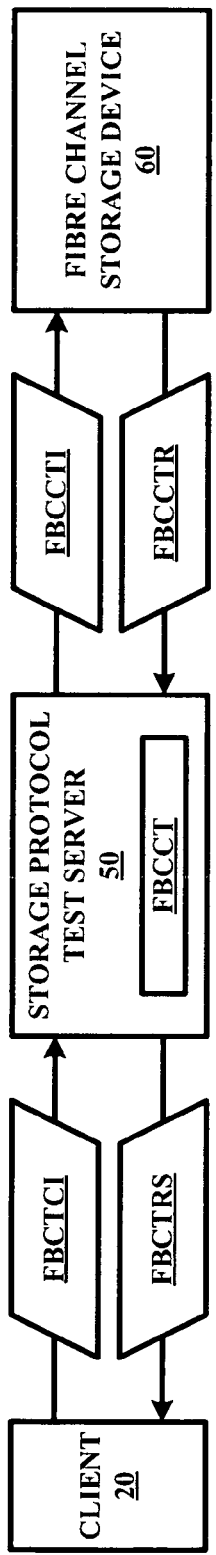
FIGS. 3-5 illustrates exemplary implementations of the flowchart illustrated in FIG. 2.
Figure 4:
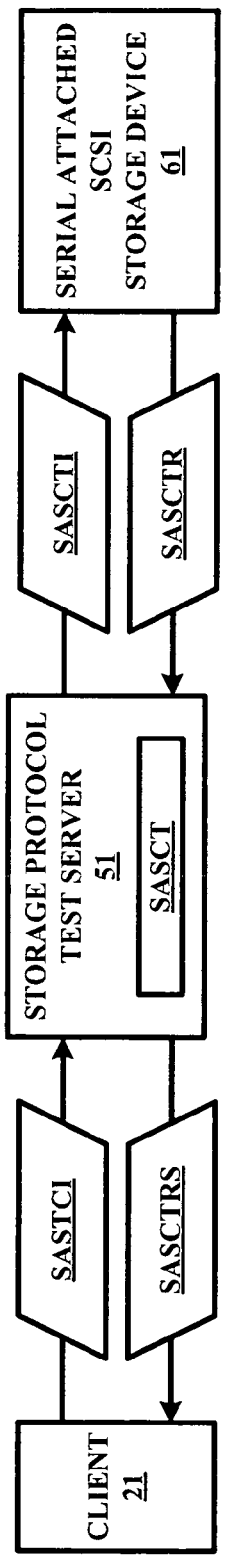
Figure 5:
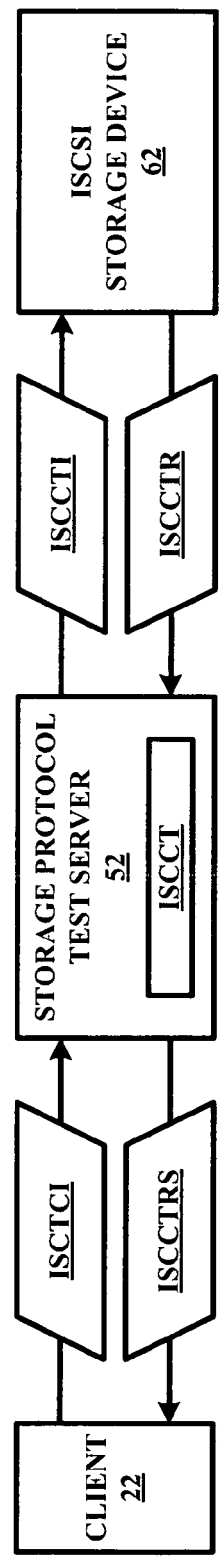

For example, as illustrated in FIG. 3, a test case session established between client 20 and storage protocol test server 50 facilitates a communication of test case information FBCTCI as set forth in the fibre channel test case 30 (FIG. 1) from client 20 to storage protocol test server 50. Also by example, as illustrated in FIG. 4, a test case session established between client 21 and storage protocol test server 51 facilitates a communication of test case information SASTCI as set forth in the serial attached SCSI test case 31 (FIG. 1) from client 21 to storage protocol test server 51. Finally, as illustrated in FIG. 5, a test case session established between client 22 and storage protocol test server 52 facilitates a communication of test case information ISCTCI as set forth in the iSCSI test case 32 (FIG. 1) from client 22 to storage protocol test server 52.

Referring again to FIG. 2, a stage S84 of flowchart 80 encompasses a storage protocol test server of the present invention generating a storage protocol conformance test based on the test case information received from the client where the storage protocol conformance test is specifically designed for testing the conformance of the corresponding storage device to the particular storage protocol set forth by the client.

For example, as illustrated in FIG. 3, storage protocol test server 50 generates a fibre channel conformance test FBCCT based on fibre channel test case information FBCTCI received from client 20 where fibre channel conformance test FBCCT is specifically designed for testing a conformance of fibre channel storage device 60 to a fibre channel storage protocol. Also by example, as illustrated in FIG. 4, storage protocol test server 51 generates a serial attached SCSI conformance test SASCT based on serial attached SCSI test case information SASTCI received from client 21 where serial attached SCSI conformance test SASCT is specifically designed for testing a conformance of serial attached SCSI storage device 61 to a serial attached SCSI storage protocol. Finally, as illustrated in FIG. 5, storage protocol test server 52 generates an iSCSI conformance test ISCCT based on iSCSI test case information ISCTCI received from client 22 where iSCSI conformance test ISCCT is specifically designed for testing a conformance of iSCSI storage device 62 to an iSCSI storage protocol.

Referring again to FIG. 2, a stage S86 of flowchart 80 encompasses a test session being established between a storage protocol test server of the present invention and an associated storage device to facilitate an exchange of test instructions and test results between the storage protocol test server and the storage device in accordance with corresponding the storage protocol conformance test.

For example, as illustrated in FIG. 3, a test session established between storage protocol test server 50 and storage device 60 facilitates an exchange of test instructions FBCCTI and test results FBCCTR between server 50 and storage device 60 in accordance with conformance test FBCCT. Also by example, as illustrated in FIG. 4, a test session established between storage protocol test server 51 and storage device 61 facilitates an exchange of test instructions SASCTI and test results SASCTR between server 51 and storage device 61 in accordance with conformance test SASCT. Finally, as illustrated in FIG. 5, a test session established between storage protocol test server 52 and storage device 62 facilitates an exchange of test instructions ISCCTI and test results ISCCTR between server 52 and storage device 62 in accordance with conformance test ISCCT.

Referring again to FIG. 2, a stage S88 of flowchart 80 encompasses the test case session being maintained to facilitate to facilitate a communication of a test case status from the storage protocol test server to the client where the test case status is indicative of a comparison of the test results to expected results set forth in the test case information.

For example, as illustrated in FIG. 3, the test case session between client 20 and storage protocol test server 50 is maintained to facilitate a communication of test case status FBCTRS, which is indicative of a comparison of test results FBCCTR to expected results set forth in the test case information FBCTCI. Also by example, as illustrated in FIG. 4, the test case session between client 21 and storage protocol test server 51 is maintained to facilitate a communication of test case status SASTRS, which is indicative of a comparison of test results SASCTR to expected results set forth in the test case information SASTCI. Finally, as illustrated in FIG. 5, the test case session between client 22 and storage protocol test server 52 is maintained to facilitate a communication of test case status ISCTRS, which is indicative of a comparison of test results ISCCTR to expected results set forth in the test case information ISCTCI.

Upon completion of stage S86, flowchart 80 can be terminated, returned to stage S82 for the communication of additional test case information from a client to a storage protocol test server of the present invention, or returned to stage S84 for the generation of further conforming testing aspects of the storage device to the storage protocol.

In practice, the manner by which modules 70-72 are structured for implementing flowchart 80 is without limitation. Thus, the following description of an embodiment of modules 70-72 as illustrated in FIGS. 6-12 is not a limitation as to a scope of a storage protocol test server of the present invention.

Figure 6:
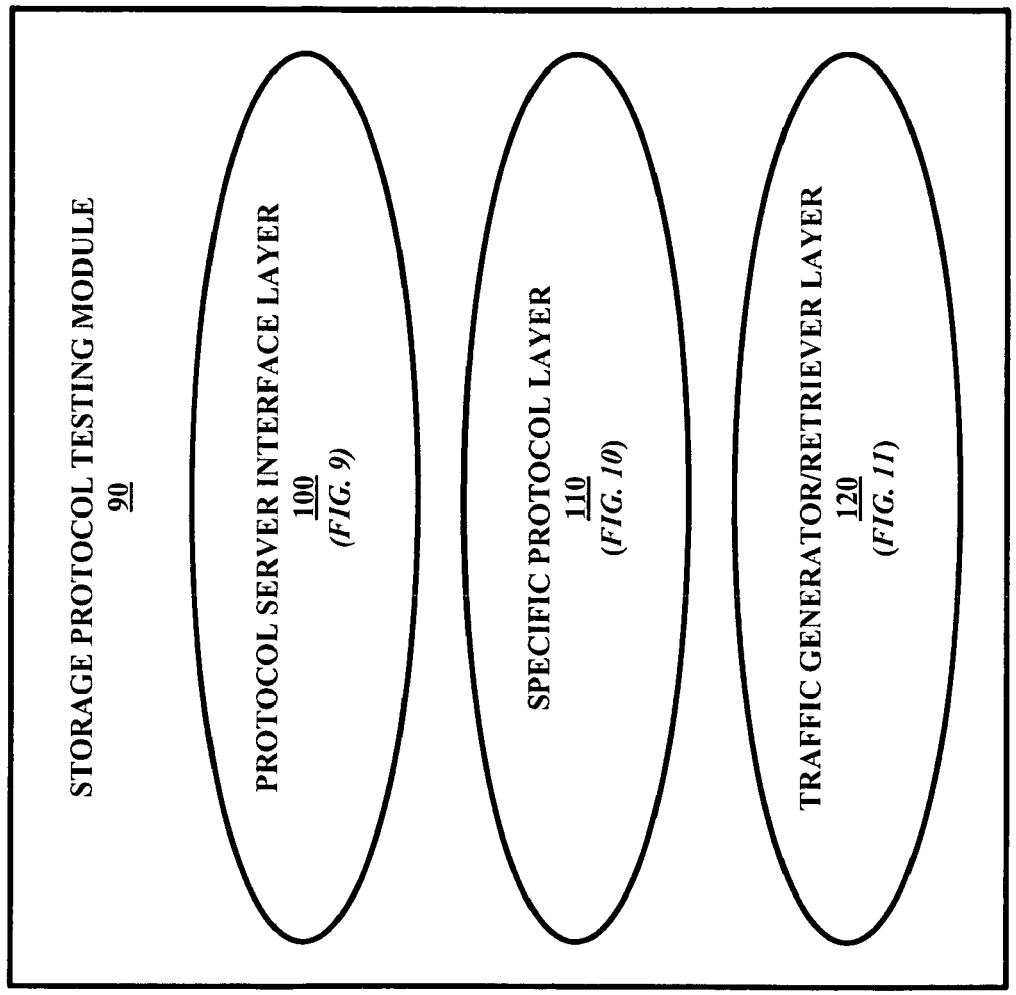
FIG. 6 illustrates one embodiment of a storage protocol testing module in accordance with the present invention.

Referring to FIG. 6, storage protocol testing module 90 is an embodiment of storage protocol testing modules 70-72 (FIG. 1) that is structurally configured with software and/or hardware in a multi-layered architecture for testing a conformance of an associated storage device to a particular storage protocol as dictated by the client. The multi-layered architecture includes a protocol test server interface layer 100, a specific protocol layer 110 and a traffic generator/retriever layer 120. Protocol test server interface layer 100 is generically configured relative to all storage protocols to thereby participate in a test case session that enables a client to dictate the elements for testing a conformance of the storage device to any type and variation of storage protocol. Specific protocol layer 110 is specifically configured to the particular storage protocol being tested on the associated storage device to thereby generate the storage protocol conformance test based on the test case information received by protocol test server interface layer 100. Traffic generator/retriever layer 120 is specifically configured to the particular storage protocol being tested on the associated storage device and configured to a specific process of traffic generation and retrieval to thereby participate in a test case session for exchanging test instructions and test results with the associated storage device in accordance with the storage protocol conformance test.

For example, when embodied in modules 70-72 (FIG. 1), protocol server interface layer 100 of modules 70-72 would be generically configured relative to fibre channel, serial attached SCSI, and iSCSI storage protocols whereby protocol server interface layer 100 is able to participate in a test case session with clients 20-22 (FIG. 1) to receive test case information related to fibre channel, serial attached SCSI, and iSCSI storage protocols, respectively.

Specific protocol layer 110 and traffic generator/retriever layer 120 of module 70 is specifically configured to the fibre channel storage protocol whereby specific protocol layer 110 of module 70 is able to generate a storage protocol conformance test based on the fibre channel storage protocol and traffic generator/retriever layer 120 of module 70 is able to participate in a test session with fibre channel storage device 60.

Specific protocol layer 110 and traffic generator/retriever layer 120 of module 71 is specifically configured to the serial attached SCSI storage protocol whereby specific protocol layer 110 of module 71 is able to generate a storage protocol conformance test based on the serial attached SCSI storage protocol and traffic generator/retriever layer 120 of module 71 is able to participate in a test session with serial attached SCSI storage device 60.

Specific protocol layer 110 and traffic generator/retriever layer 120 of module 72 is specifically configured to the iSCSI storage protocol whereby specific protocol layer 110 of module 72 is able to generate a storage protocol conformance test based on the iSCSI storage protocol and traffic generator/retriever layer 120 of module 72 is able to participate in a test session with iSCSI storage device 60.

Referring again to FIG. 6, in operation, the multi-layered architecture of module 90 receives test case information from a client to thereby generate and execute a conformance test specifically designed for testing a conformance of an associated storage device to a particular storage protocol as set forth in the test case information. Prior to receiving the test case information, layers 100, 110 and 120 are not operably coupled. Upon receiving the test case information, layers 100 and 110 are operably coupled to enable layer 110 to facilitate the generation of the storage protocol conformance test based on the test case information, and layers 110 and 120 are operably coupled to facilitate an execution of the storage protocol conformance test.

This "loose coupling" of layers 100, 110 and 120 is enabled by the format of the test case information. In practice, the format of the test case information is without limitation. Thus, the following description of a test case model as illustrated in FIG. 7 is not a limitation to a scope of test case information of the present invention.

Figure 7:
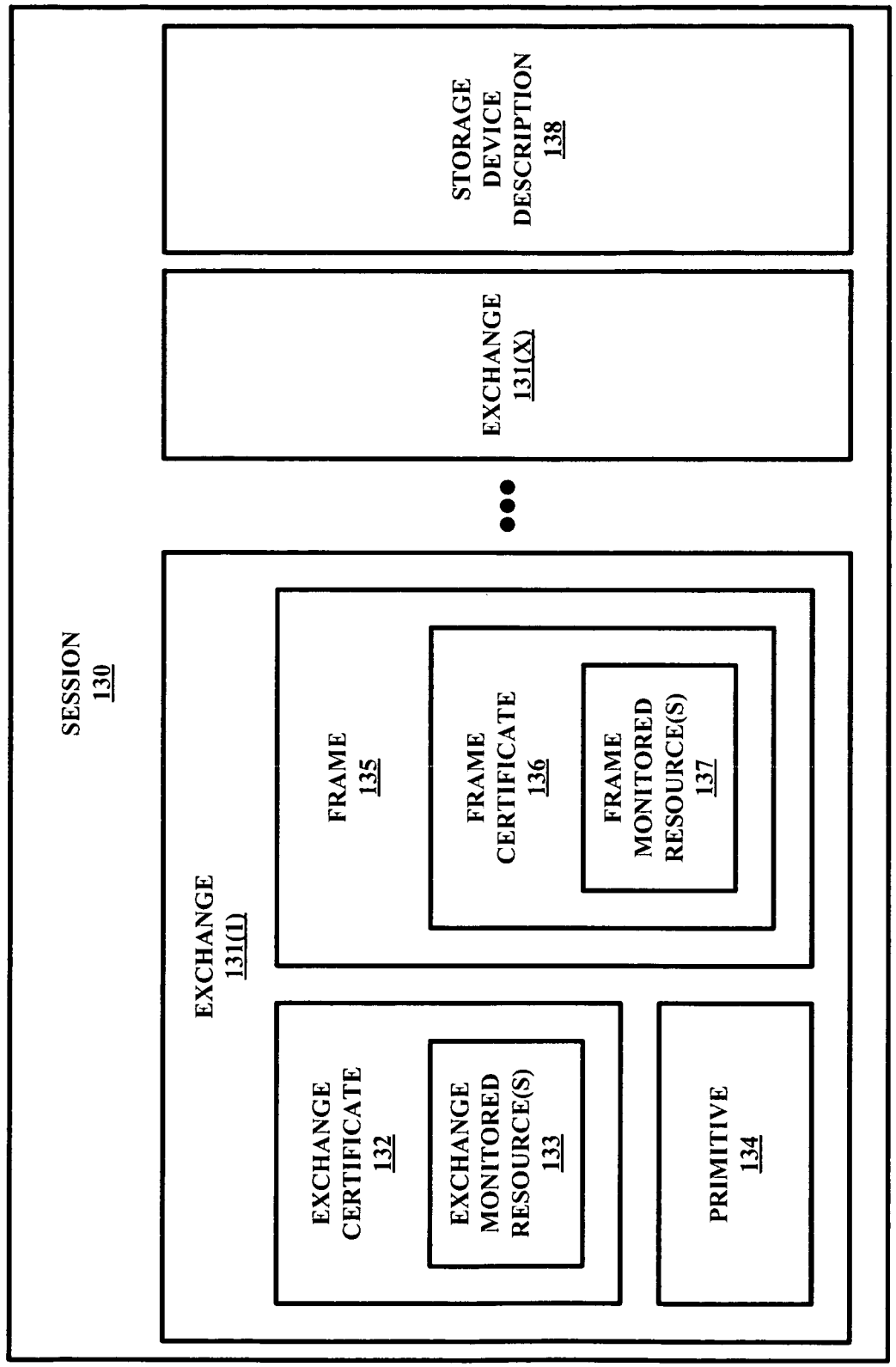
FIG. 7 illustrates an exemplary test case information model in accordance with the present invention.

Referring to FIG. 7, the test case model includes a session 130 at the highest level for providing a specific storage protocol context for the conformance test. Examples of information recited within session 130 includes, but is not limited to, a connection type, an identification value, a session intent, a class of service, a topology, a sender ID and a receiver ID.

Session 130 can include X number of exchanges 131 for specifying protocol test operations for the conformance test, where $X \geq 1$. One form of an exchange is a command exchange for defining storage commands to be tested. Examples of storage commands recited in a command exchange includes, but is not limited to, a login, establishing a link or connection, read and write commands, and a location to a particular position within a storage media of the storage device. The verification of such storage commands can be based on an exchange certificate 132 specifying expected test results of certain exchange monitored resources 133 referencing one or more monitored properties from an execution of the storage commands by the storage device.

Another form of an exchange is a frame exchange based on any frames 135 included with an exchange 131. Each frame 135, if any, encapsulates certain information to be exchanged between a storage protocol test server and an associated storage device under test. Examples of such information encapsulated within a frame includes, but is not limited to, a source ID, a target ID, exchange ID and sequence ID, and payload information. The verification of such exchange commands can be based on a frame certificate 136 specifying expected test results of a certain frame monitored resources 137 referencing one or more monitored properties and an exchange certificate 132 from the exchange of information between the storage protocol test server and the associated storage device under test.

A final form of an exchange is a primitive exchange based on any primitives 134 included within an exchange 131. Each primitive, if any, provides for a link level control of an information flow between a storage protocol test server and an associated storage device. Those having ordinary skill in the art will appreciate that a link level control of an information flow is dependent upon an associated storage protocol.

Session 130 also includes a storage device description 138 for providing the client with information related to the attributes of the storage device under test.

Figure 8:
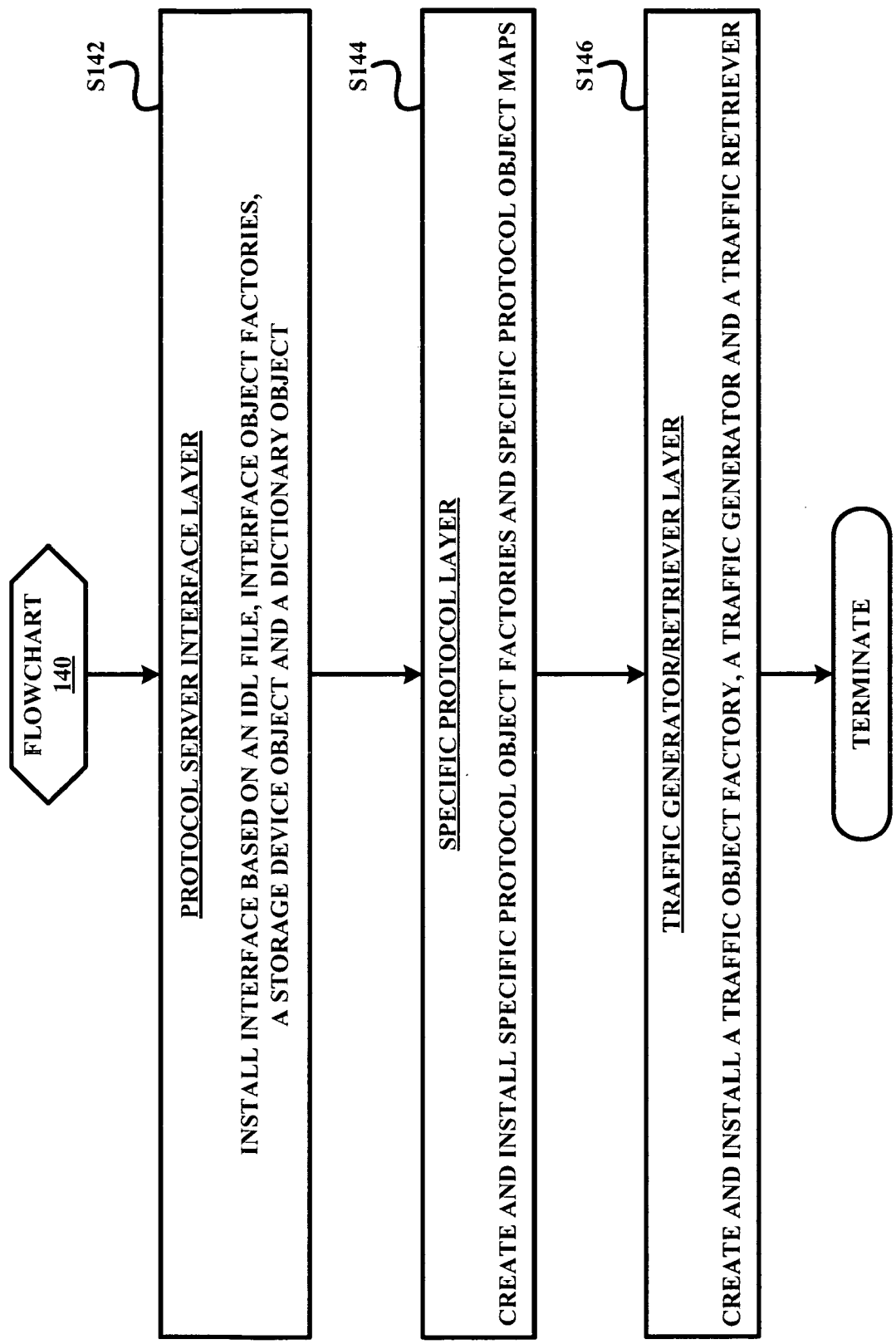
FIG. 8 illustrates a flowchart representative of one embodiment of a storage protocol installation programming method in accordance with the present invention.

Referring again to FIG. 6, the structural configuration of protocol test server interface layer 100, specific protocol layer 110 and traffic generator/retriever layer 120 occurs in two phases. A first configuration phase entails an installation programming of a storage protocol test server of the present invention within a storage environment (e.g. installing servers 50-52 in the storage environment illustrated in FIG. 1). FIG. 8 illustrates a storage protocol installation programming method represented by a flowchart 140 that is implemented during this configuration phase.

Figure 9:
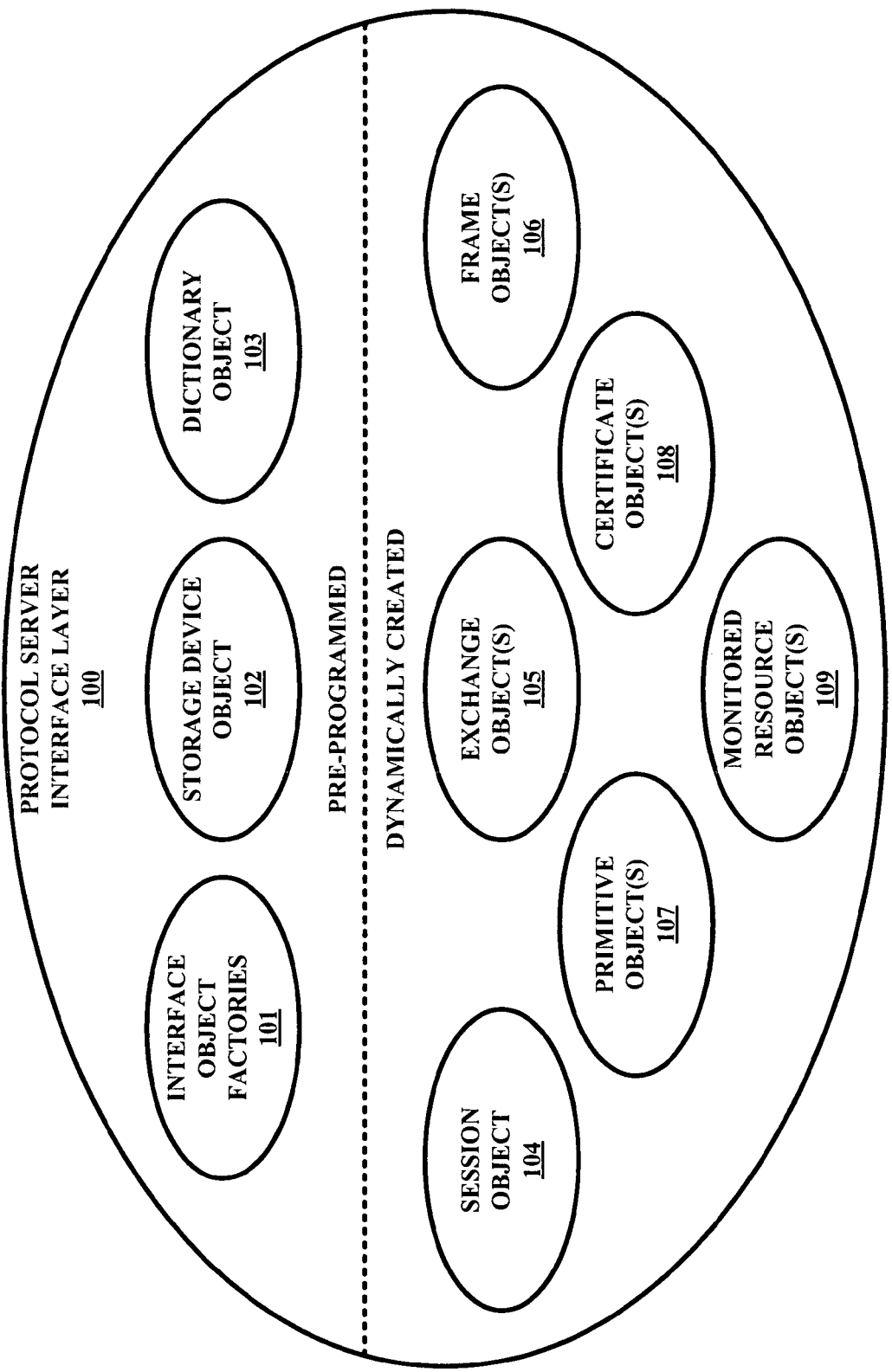
FIG. 9 illustrates an exemplary protocol test server interface in accordance with the present invention.

Referring again to FIG. 8, a stage S142 of flowchart 140 encompasses the installation of an interface as specified by an interface definition language ("IDL") file (not shown), creation and installation of interface object factories 101, a storage device object 102, and a dictionary object 103 as illustrated in FIG. 9. The IDL file specifies, per the Common Object Request Broker Architecture ("CORBA") the interface provided by the storage protocol test server for use by any client(s). Each interface object factory 101 (e.g., session, exchange, frame, primitive, certificate, and monitored resource) is structurally configured to create an interface object based on test case information as will be further explained in connection with FIG. 12. Storage device object 102 is structurally configured to contain attributes of the storage device under test. Dictionary object 103 is structurally configured to provide mappings for properties as name value pairs, specifying for a given property name, its location in the frame structure.

Figure 10:
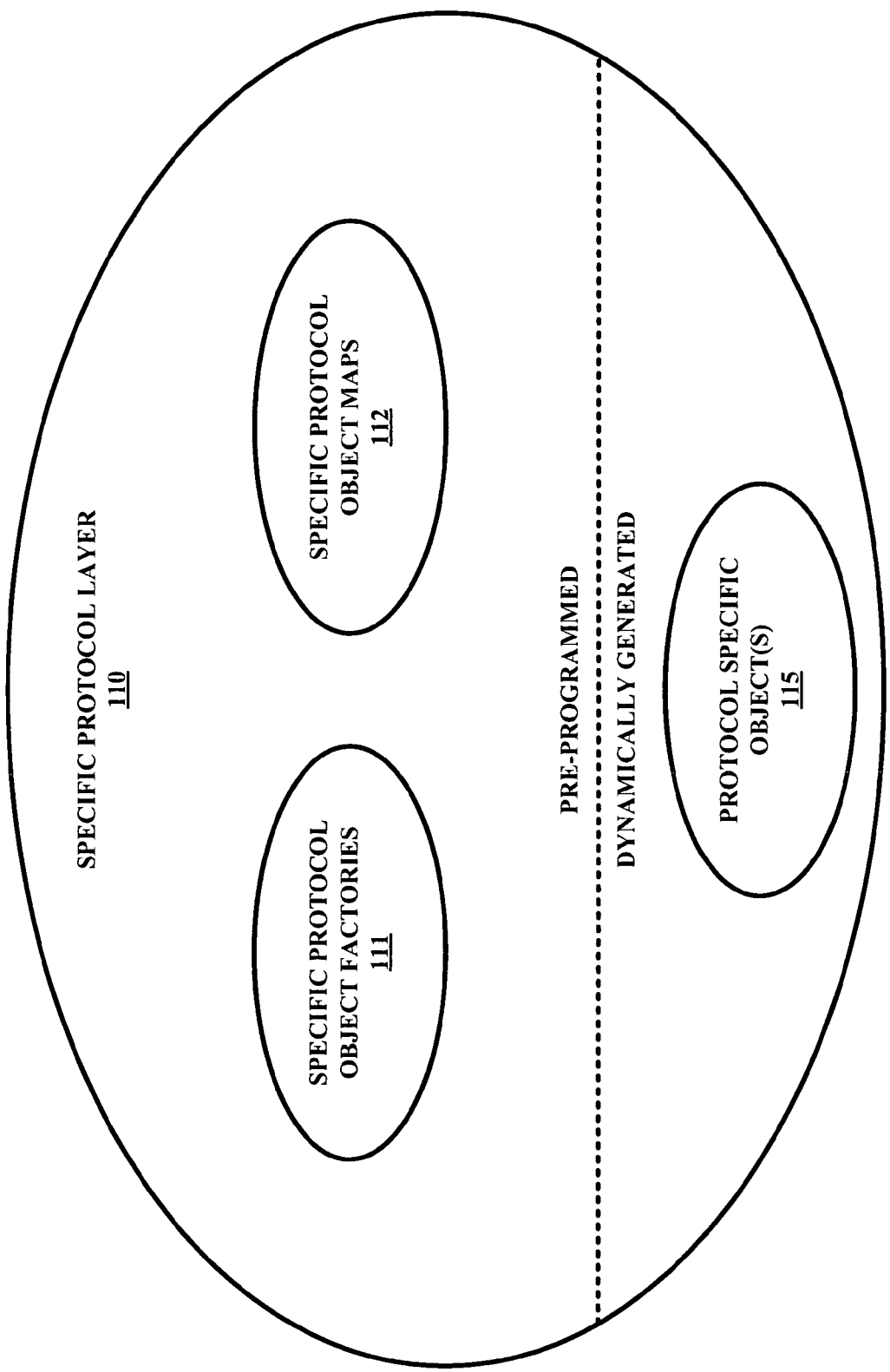
FIG. 10 illustrates an exemplary specific protocol layer in accordance with the present invention.

Referring again to FIG. 8, a stage S144 of flowchart 140 encompasses a creation and installation of specific protocol object factories 111 and specific protocol object maps 112 within specific protocol layer 110 as illustrated in FIG. 10. As will be further explained in connection with FIG. 12, each specific protocol object factory 111 (e.g., session, exchange, frame and primitive) is structurally configured to create a protocol specific object 115 corresponding to an interface object created by an interface object factory 101, and each object map 112 is structurally configured to transfer data between the corresponding interface object and the protocol specific object 115. Object factories 111 and object maps 112 are associated within a particular storage protocol (e.g., fibre channel, serial attached SCSI, or iSCSI). In practice, a single assembly of object factories 111 and object maps 112 can be installed within specific protocol layer 110 to thereby exclusively implement a particular storage protocol, or multiple assemblies of object factories 111 and object maps 112 can be installed within specific protocol layer 110 to thereby selectively implement one of a variety of storage protocols and variations thereof.

Referring again to FIG. 8, a stage S146 of flowchart 140 encompasses a creation and installation of a traffic object factory 121, a protocol specific traffic generator 122 and a protocol specific traffic retriever 123 within traffic generator/retrieve layer 120 as illustrated in FIG. 1. Traffic object factory 121 creates protocol specific traffic generator 121 and protocol specific traffic retriever 122 as determined by a configuration file of the associated server where the configuration file specifies a particular storage protocol for testing the associated storage device.

Figure 12:
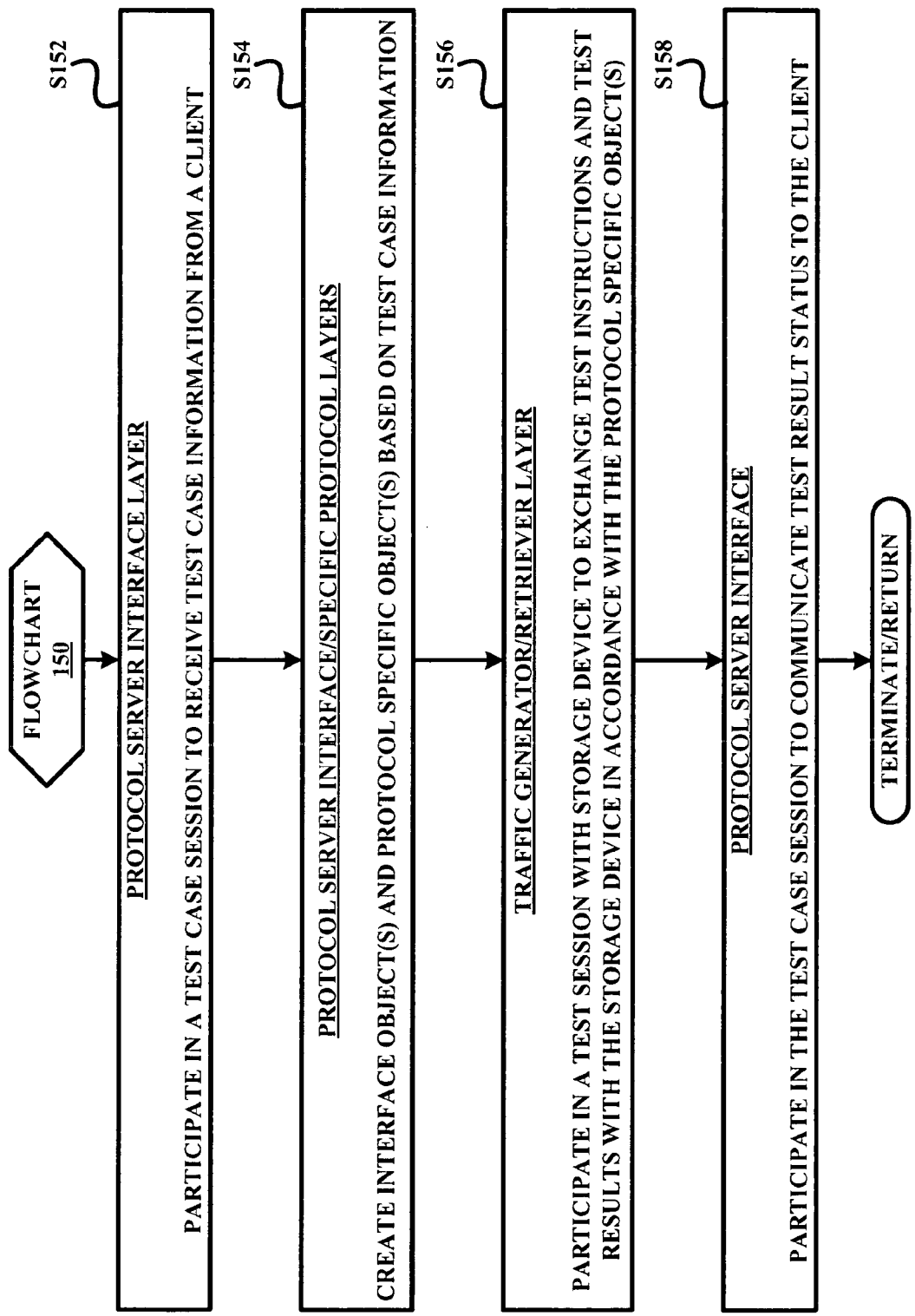
FIG. 12 illustrates a flowchart representative of one embodiment of a storage protocol operation method in accordance with the present invention.

A second configuration phase of protocol test server interface layer 100, specific protocol layer 110 and traffic generator/retriever layer 120 entails a dynamic generation of various objects and a queue while the server is being operated to test a conformance of an associated storage device to a particular storage protocol. FIG. 12 illustrates a storage protocol operation method represented by a flowchart 140 that is implemented during this second configuration phase.

Referring to FIG. 12, a stage S152 of flowchart 150 encompasses the participation in a test case session with a client to receive test case information in the context of the test case information model (FIG. 7). A stage S154 of flowchart 150 encompasses object factories 111 (FIG. 10) and object maps (FIG. 10) creating the necessary interface objects 104-109 (FIG. 9) and protocol specific objects 115 (FIG. 10) in accordance with the received test case information.

Figure 11:
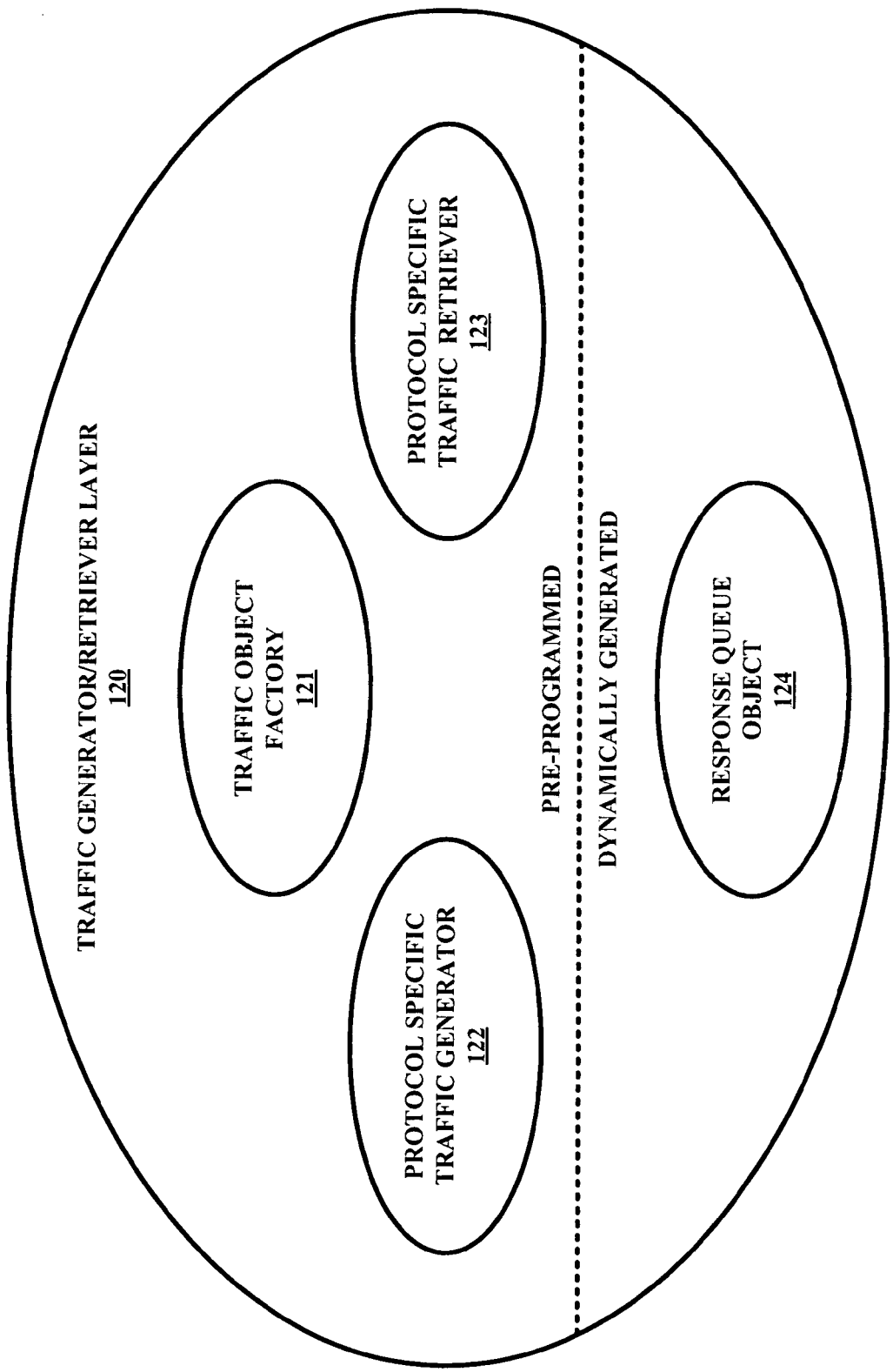
FIG. 11 illustrates an exemplary traffic generator/retriever layer in accordance with the present invention.

A stage S156 of flowchart 150 encompasses a participation in a test session with the associated storage device to exchange test instructions and test results in accordance with the protocol specific objects 115. Specifically, the client can apply one of the protocol specific objects 115 whereby the protocol specific traffic generator 121 (FIG. 11) communicates test instructions of the applied protocol specific object 115 via a conventional application program interface ("API") of the attached traffic generator/retriever device, which in turn communicates test results via its API to the protocol specific traffic retriever 122 (FIG. 11). The received test results are stored by traffic retriever 122 within a response queue object 124 (FIG. 11) of the layer 120.

A stage S158 of flowchart 150 encompasses a participation in the test case session with the client to communicate a test case status to the client. The test case status is derived from a logical comparison of the received test results to an expected result of a monitored property as specified by a certificate object 108 (FIG. 9) and a monitored resource object 109 (FIG. 9). The certificate object 108 is modified to indicate whether the comparison was or was not satisfactory, and this indication is communicated to the client. In particular, failure justification text will be added to the certificate object for an unsatisfactory comparison to enable a client to log the failure justification text.

Upon completion of stage S158, flowchart 150 can be terminated, returned to stage S154 for creating of additional interface objects and protocol specific objects, or returned to stage S156 for application of another protocol specific object.

From the preceding description of FIGS. 6-12, those having ordinary skill in the art will appreciate numerous advantages of the present invention. Foremost among such advantages is ability to reuse the multi-layered architecture of a storage protocol testing module of the present invention over a variety of storage protocols and a variety of variations of each storage protocol.

Referring to FIG. 1, in one practical embodiment, modules 70-72 are embodied in a new software module installed within a memory of respective servers 50-52 whereby the processor(s) of respective servers 50-52 can execute respective modules 70-72 to implement flowchart 80 (FIG. 2). Modules 70-72, when embodied as a software module, can be written in any conventional programming language by those having ordinary skill in the art appreciating the description herein of FIGS. 6-12.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A computer readable storage medium tangibly embodying a program of machine-readable instructions executable by a processor to operate a storage protocol test server, the operations comprising:

participating in a test case session between the storage protocol test server and a client to facilitate a communication of test case information from the client to the storage protocol test server, wherein the test case information specifies elements for testing a conformance of a storage device to a storage protocol;

generating a storage protocol conformance test based on the test case information received from the client, wherein the storage protocol conformance test is specifically designed for testing the conformance of the storage device to the storage protocol, wherein a storage protocol testing module includes a protocol server interface layer and a specific protocol layer, wherein the protocol server interface layer is generally configured to the storage protocol and at least one additional storage protocol, wherein the specific protocol layer is specifically configured to the storage protocol, and wherein the storage protocol is a single storage protocol;

participating in a test session between the storage protocol test server and the storage device to facilitate an exchange of test instructions and test results between the storage protocol test server and the storage device in accordance with the storage protocol conformance test; and participating in the test case session between the storage protocol test server and the client to facilitate a communication of a test case status from the storage protocol test server to the client, wherein the test case status is indicative of a comparison of the test results to expected results set forth in the test case information, and wherein the storage protocol is a Fibre Channel storage protocol and the at least one additional storage protocol is a Serial Attached SCSI storage protocol.

2. The computer readable storage medium of claim 1, wherein the program includes the protocol server interface layer and the specific protocol layer;

wherein the protocol server interface layer is operable to be interfaced to receive the test case information; and wherein the protocol server interface is further operable to be coupled to the specific protocol layer in response to receiving the test case information to thereby facilitate the generation of the storage protocol conformance test by the specific protocol layer based on the test case information received by the protocol server interface from the client.

3. The computer readable storage medium of claim 2, wherein the program further includes a traffic generator/retriever layer operable to be coupled to the specific protocol layer and to be interfaced with the storage device to facilitate an execution of the storage protocol conformance test.

4. The computer readable storage medium of claim 3, wherein the traffic generator/retriever layer is specifically configured to the storage protocol.

5. A storage protocol test server, comprising:

a processor; and a memory storing instructions operable with the processor, the instructions being executed for:

participating in a test case session between the storage protocol test server and a client to facilitate a communication of test case information from the client to the storage protocol test server, wherein the test case information specifies elements for testing a conformance of a storage device to a storage protocol;

generating a storage protocol conformance test based on the test case information received from the client, wherein the storage protocol conformance test is specifically designed for testing the conformance of the storage device to the storage protocol, wherein a storage protocol testing module includes a protocol server interface layer and a specific protocol layer, wherein the protocol server interface layer is generally configured to the storage protocol and at least one additional storage protocol, wherein the specific protocol layer is specifically configured to the storage protocol, and wherein the storage protocol is a single storage protocol;

participating in a test session between the storage protocol test server and the storage device to facilitate an exchange of test instructions and test results between the storage protocol test server and the storage device in accordance with the storage protocol conformance test; and participating in the test case session between the storage protocol test server and the client to facilitate a communication of a test case status from the storage protocol test server to the client, wherein the test case status is indicative of a comparison of the test results to expected results set forth in the test case information, wherein the storage protocol is a Fibre Channel storage protocol and the at least one additional storage protocol is a Serial Attached SCSI storage protocol.

6. The storage protocol test server of claim 5, wherein the memory includes the protocol server interface layer and the specific protocol layer;

wherein the protocol server interface layer is operable to be interfaced to receive the test case information; and wherein the protocol server interface is further operable to be coupled to the specific protocol layer in response to receiving the test case information to thereby facilitate the generation of the storage protocol conformance test by the specific protocol layer based on the test case information received by the protocol server interface from the client.

7. The storage protocol test server of claim 5, wherein the memory further includes a traffic generator/retriever layer operable to be coupled to the specific protocol layer and interface to the storage device to facilitate an execution of the storage protocol conformance test.

8. The storage protocol test server of claim 5, wherein the traffic generator/retriever layer is specifically configured to the storage protocol.

9. A method of operating a storage protocol test server, comprising:

participating in a test case session between the storage protocol test server and a client to facilitate a communication of test case information from the client to the storage protocol test server, wherein the test case information specifies elements for testing a conformance of a storage device to a storage protocol;

generating a storage protocol conformance test based on the test case information received from the client, wherein the storage protocol conformance test is specifically designed for testing the conformance of the storage device to the storage protocol, wherein a storage protocol testing module includes a protocol server interface layer and a specific protocol layer, wherein the protocol server interface layer is generally configured to the storage protocol and at least one additional storage protocol, wherein the specific protocol layer is specifically configured to the storage protocol, and wherein the storage protocol is a single storage protocol;

participating in a test session between the storage protocol test server and the storage device to facilitate an exchange of test instructions and test results between the storage protocol test server and the storage device in accordance with the storage protocol conformance test; and participating in the test case session between the storage protocol test server and the client to facilitate a communication of a test case status from the storage protocol test server to the client, wherein the test case status is indicative of a comparison of the test results to expected results set forth in the test case information, wherein the storage protocol is a Fibre Channel storage protocol and the at least one additional storage protocol is a Serial Attached SCSI storage protocol.

10. A storage protocol testing module embodied in a storage protocol test server that includes a processor that executes instructions included in the storage protocol testing module, the storage protocol testing module comprising:

a protocol server interface layer operable to participate in a test case session between the storage protocol test server and a client to facilitate a communication of test case information from the client to the storage protocol test server, wherein the test case information specifies elements for testing a conformance of a storage device to a storage protocol, wherein the protocol server interface layer is generally configured to the storage protocol and at least one additional storage protocol;

a specific protocol object layer operable to generate a storage protocol conformance test based on the test case information received from the client, wherein the storage protocol conformance test is specifically designed for testing the conformance of the storage device to the storage protocol, wherein the specific protocol layer is specifically configured to the storage protocol, and wherein the storage protocol is a single storage protocol; and a traffic generator/retriever layer operable to participate in a test session between the storage protocol test server and the storage device to facilitate an exchange of test instructions and test results between the storage protocol test server and the storage device in accordance with the storage protocol conformance test, wherein the protocol server interface is further operable to participate in the test case session between the storage protocol test server and the client to facilitate a communication of a test case status from the storage protocol test server to the client, wherein the test case status is indicative of a comparison of the test results to expected results set forth in the test case information, and wherein the storage protocol is a Fibre Channel storage protocol and the at least one additional storage protocol is a Serial Attached SCSI storage protocol.

11. The storage protocol testing module of claim 10, wherein the traffic generator/retriever layer is specifically configured to the storage protocol.

12. The storage protocol testing module of claim 10,
wherein the protocol server interface layer is operable to be interfaced to receive the test case information; and
wherein the protocol server interface is further operable to be coupled to the specific protocol layer in response to receiving the test case information to thereby facilitate the generation of the storage protocol conformance test by the specific protocol layer based on the test case information received by the protocol server interface from the client.

13. The storage protocol testing module of claim 10, wherein the traffic generator/retriever layer is operable to be coupled to the specific protocol layer and to be interfaced with the storage device to facilitate an execution of the storage protocol conformance test.

14. The computer readable storage medium of claim 1, wherein the specific protocol layer includes specific protocol object factories and specific protocol object maps, wherein a traffic generator/retriever layer includes a traffic object factory, a protocol specific traffic generator, and a protocol specific traffic retriever, and wherein the protocol service interface layer includes interface object factories, a storage device object and a dictionary object.

15. The storage protocol test server of claim 5, wherein the specific protocol layer includes specific protocol object factories and specific protocol object maps, wherein a traffic generator/retriever layer includes a traffic object factory, a protocol specific traffic generator, and a protocol specific traffic retriever, and wherein the protocol service interface layer includes interface object factories, a storage device object and a dictionary object.

16. The method of claim 9, wherein the specific protocol layer includes specific protocol object factories and specific protocol object maps, wherein a traffic generator/retriever layer includes a traffic object factory, a protocol specific traffic generator, and a protocol specific traffic retriever, and wherein the protocol service interface layer includes interface object factories, a storage device object and a dictionary object.

17. The storage protocol testing module of claim 10, wherein the specific protocol layer includes specific protocol object factories and specific protocol object maps, wherein a traffic generator/retriever layer includes a traffic object factory, a protocol specific traffic generator, and a protocol specific traffic retriever, and wherein the protocol service interface layer includes interface object factories, a storage device object and a dictionary object.

* * * * *

UNITED STATES PATENT AND TRADEMARK OFFICE
CERTIFICATE OF CORRECTION

| | | |
|---|---|---|
| PATENT NO. | : 7,661,034 B2 | Page 1 of 1 |
| APPLICATION NO. | : 11/041771 | |
| DATED | : February 9, 2010 | |
| INVENTOR(S) | : Johnson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1199 days.

Signed and Sealed this

Thirtieth Day of November, 2010

David J. Kappos
*Director of the United States Patent and Trademark Office*